United States Patent
Rapo et al.

(10) Patent No.: US 8,037,540 B2
(45) Date of Patent: Oct. 11, 2011

(54) METHOD AND SYSTEM FOR PROTECTING A VIRTUAL COMMUNITY VISITOR FROM UNAUTHORIZED SOCIAL INTERACTION

(75) Inventors: Andrew Rapo, Studio City, CA (US); Christopher Thomes, Encino, CA (US); Allan Jones, Valencia, CA (US); Steven Parkis, Valencia, CA (US); Paul Yanover, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 938 days.

(21) Appl. No.: 12/009,241

(22) Filed: Jan. 17, 2008

(65) Prior Publication Data

US 2009/0187994 A1 Jul. 23, 2009

(51) Int. Cl.
*G06F 21/22* (2006.01)

(52) U.S. Cl. ............. 726/27; 726/3; 713/182; 380/200; 709/206; 709/204

(58) Field of Classification Search ........................ None
See application file for complete search history.

(56) References Cited

U.S. PATENT DOCUMENTS

| | | | |
|---|---|---|---|
| 2002/0120757 A1 | 8/2002 | Sutherland et al. | |
| 2008/0109878 A1* | 5/2008 | Delegue et al. | 726/3 |
| 2008/0313469 A1* | 12/2008 | Giblin et al. | 713/182 |

FOREIGN PATENT DOCUMENTS

WO WO 02/09395 1/2002

OTHER PUBLICATIONS

Carminati et al , OTM workshops 2006 Lecture Notes in Computer Science, pp. 1734-1744, Jan. 2006.*
Carminati, et al., *Private Relationships in Social Networks*, IEEE 23rd International Conference, pp. 163-171 (Apr. 2007).
Carminati, et al., *Rule-Based Access Control for Social Networks*, OTM 2006 Workshops Lecture Notes in Computer Science, pp. 1734-1744 (Jan. 2006).

\* cited by examiner

*Primary Examiner* — Nasser Moazzami
*Assistant Examiner* — Fikremariam A Yalew
(74) *Attorney, Agent, or Firm* — Farjami & Farjami LLP

(57) ABSTRACT

There is provided a method of protecting a virtual community visitor from unauthorized social interaction comprising receiving a request from the virtual community visitor seeking access to a virtual community content, determining whether the virtual community content includes at least one social interaction opportunity, prompting the virtual community visitor to provide a visitor identity if the virtual community content includes at least one social interaction opportunity, associating the visitor identity with a socialization level, and utilizing the socialization level in one or more permission database to regulate social interaction. In one embodiment, a system for protecting a virtual community visitor from unauthorized social interaction comprises a virtual community content server, and a processor configured to execute instructions included in a social interaction control software to associate a socialization level with the virtual community visitor and utilize the socialization level in one or more permission database.

18 Claims, 6 Drawing Sheets

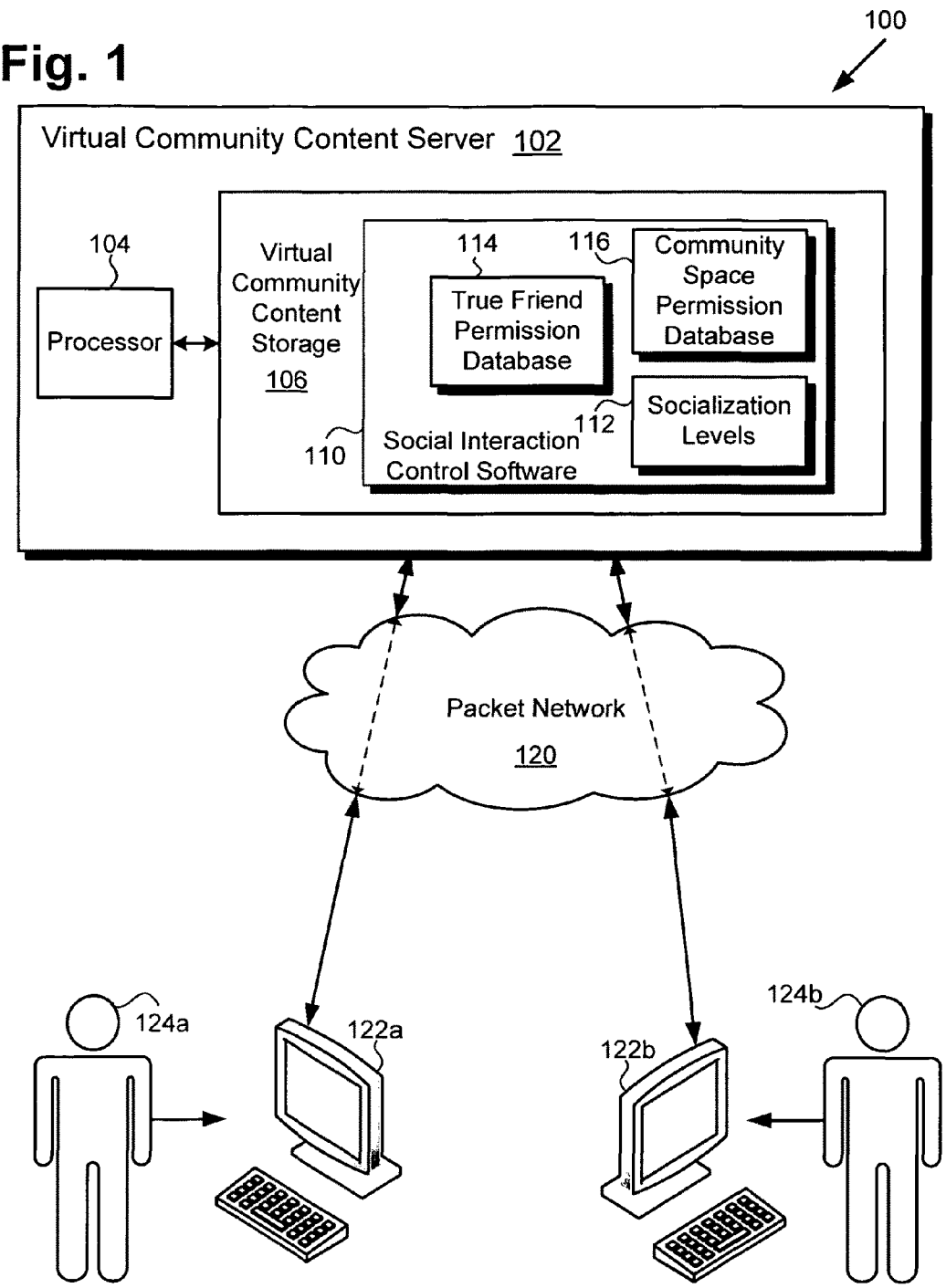

Fig. 2A — True Friend Permission Database

Socialization Levels (212) — 214

| | 1 | 2 | 3 | 4 |
|---|---|---|---|---|
| 1 | Speed Chat | Speed Chat | Speed Chat | Speed Chat |
| 2 | Speed Chat | Open Chat | Open Chat | Open Chat |
| 3 | Speed Chat | Open Chat | Open Chat | Open Chat |
| 4 | Speed Chat | Open Chat | Open Chat | Open Chat |

Socialization Levels (212)

Fig. 2B — Community Space Permission Database

Socialization Levels (212) — 216

| | 1 | 2 | 3 | 4 |
|---|---|---|---|---|
| 1 | Speed Chat | Speed Chat | Speed Chat | Speed Chat |
| 2 | Speed Chat | Speed Chat | Speed Chat | Speed Chat |
| 3 | Speed Chat | Speed Chat | Speed Chat | Speed Chat |
| 4 | Speed Chat | Speed Chat | Speed Chat | Open Chat |

Socialization Levels (212)

METHOD AND SYSTEM FOR PROTECTING A VIRTUAL COMMUNITY VISITOR FROM UNAUTHORIZED SOCIAL INTERACTION

BACKGROUND OF THE INVENTION

1. Field of the Invention

The present invention relates generally to remote communication. More particularly, the present invention relates to computer mediated remote communication.

2. Background Art

We are presently in the midst of a virtual culture revolution in which the role of computers as socialization portals is beginning to rival their earlier roles as information management and commercial tools. The unprecedented popularity of websites such as MySpace and Facebook, for example, have demonstrated the increasing importance of Internet-based virtual communities, which are capable of providing both entertainment and social networking opportunities. These popular Internet resources show that as the demographic of computer users has broadened and diversified to include a younger population at ease with sophisticated technology, computer mediated virtual communities are becoming resources of choice for the development of casual social relationships.

There are numerous benefits to the virtually borderless communities that can arise through computer mediated socialization, among them being the benefits accruing, particularly to the young, from appreciation of the varying life experiences of socialization partners of different ethnicities or living in far-flung geographic locales. There are also significant hazards to developing virtual relationships, however, flowing in part from the intrinsic remoteness of the interactions. Physical remoteness, as well as perhaps age disparity, and divergence in social mores, may lead to misunderstanding, psychological injury, or worse. Unfortunately, these risks are particularly acute for the young and potentially socially inexperienced demographic most apt to seek out virtual venues for social interaction opportunities.

A conventional approach to protecting visitors to virtual communities is to require users to register with the website in order to gain access to its content. By requiring a user to provide personal information including details of their true identity, those websites attempt to exclude users having a nefarious intent, while also providing a deterrent to misbehavior on the part of well intended registered users who might express themselves in a less circumspect manner if their communications were truly anonymous. Although successful in erecting something of a barrier against inappropriate social interaction, the all or nothing nature of this conventional approach has undesirable consequences for most virtual socialization content providers.

The disadvantages associated with the conventional approach are especially undesirable for providers of mixed content, combining commercial entertainment or information content that does not include a socialization component, with content that does offer opportunities for social interaction. Because providers of mixed content desire maximum exposure for their commercial content, they aspire to attract as many visitors as possible to their virtual communities, and seek to make their commercial content generally accessible to all visitors. As hosts of social interaction enabling content, however, those same providers must find a way to manage social interaction so as to prevent inappropriate socialization. The challenges posed by this dilemma are clearly not resolved, or even adequately addressed, by the conventional all or nothing approach.

Accordingly, there is a need to overcome the drawbacks and deficiencies in the art by providing a method of protecting visitors to virtual communities enabling of social interaction from inappropriate or unauthorized social contact, while advantageously making co-located commercial content generally accessible.

SUMMARY OF THE INVENTION

A method and system for protecting a virtual community visitor from unauthorized social interaction, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1 shows a diagram of an exemplary system including social interaction control software for protecting a virtual community visitor from unauthorized social interaction, according to one embodiment of the present invention;

FIG. 2A shows a permission database suitable for use in a method of protecting a virtual community visitor from unauthorized social interaction, according to one embodiment of the present invention;

FIG. 2B shows another permission database suitable for use in a method of protecting a virtual community visitor from unauthorized social interaction, according to one embodiment of the present invention;

DETAILED DESCRIPTION OF THE INVENTION

Figure 3:
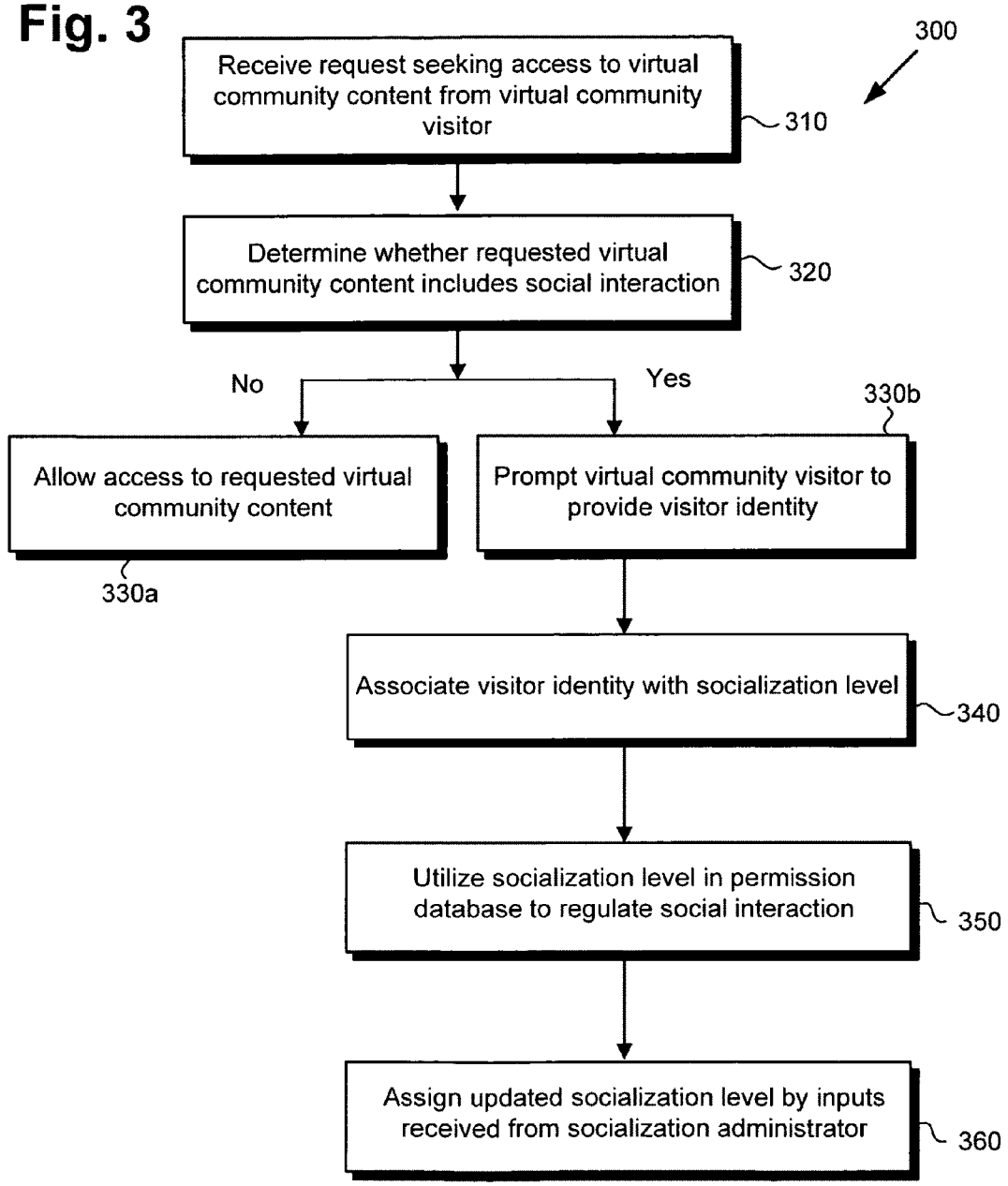
FIG. 3 is a flowchart presenting a method of protecting a virtual community visitor from unauthorized social interaction, according to one embodiment of the present invention.

The present application is directed to a method of protecting a virtual community visitor from unauthorized social interaction. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows a diagram of system 100 including social interaction control software 110 for protecting a virtual community visitor from unauthorized social interaction, according to one embodiment of the present invention. System 100, in FIG. 1, comprises virtual community content server 102 including processor 104, and virtual community content storage 106 storing social interaction control software 110. As shown in FIG. 1, according to the present embodiment, social interaction control software 110 includes data files corresponding to socialization levels 112, true friend permission database 114, and community space permission database 116. Also shown in FIG. 1 are packet network 120, client computers 122a and 122b, and virtual community visitors 124a and 124b. It is noted that although client computers 122a and 122b are represented as personal computers (PCs) in FIG. 1, in one embodiment one or both of client computers 122a and 122b may comprise a mobile communication device such as a mobile telephone, digital media player, personal digital assistant (PDA), wireless computer, or wireless gaming console, for example.

According to the embodiment of FIG. 1, virtual community visitors 124a and 124b may utilize respective client computers 122a and 122b, and packet network 120, to separately seek access to content stored by virtual community content storage 106. Processor 104, which may be a central processing unit (CPU), for example, can be used to execute social interaction control software 110 to protect virtual community visitors 124a and 124b from unauthorized social interaction while they enjoy content available on virtual community content server 102. Social interaction control software 110 is configured to receive a request to access virtual community content from a virtual community visitor, such as virtual community visitors 124a and 124b, in FIG. 1, and determine whether the requested virtual community content provides an opportunity for social interaction, for example, communication between virtual community visitors 124a and 124b through virtual community content server 102. Where the request seeks access to virtual community content that does not include an opportunity for social interaction, such as commercial entertainment or information content, for example, social interaction control software 110 allows access to the virtual community content without requiring additional visitor information or imposing constraints.

Where, however, the request does seek access to virtual community content that provides one or more opportunities for social interaction, social interaction control software 110 is configured to direct processor 104 to perform functions regulating the social interaction. In the embodiment of FIG. 1, regulation is achieved by prompting the virtual community visitor to provide a visitor identity, and associating the visitor identity with a socialization level. Social interaction control software 110 then utilizes that socialization level in one or more permission databases to regulate social interaction amongst virtual community visitors, such as virtual community visitors 124a and 124b in FIG. 1. Although in the present embodiment, the one or more permission databases are represented by true friend permission database 114 and community space permission database 116, in other embodiments there may be as few as one permission database, or numerous permission databases, and those respective databases may use permission matching criteria other than those utilized in true friend permission database 114 and community space permission database 116.

As shown in FIG. 1, virtual community content server 102 can be accessed through packet network 120, using client computers 122a and 122b. In that instance, social interaction control software 110 may be implemented by processor 104 to regulate social interaction on a community website, accessible over a packet network such as the Internet, for example. Alternatively, processor 104 and social interaction control software 110 may reside on a server supporting a local area network (LAN), for instance, or included in another type of limited distribution network supporting virtual community 102.

The regulation provided by social interaction control software 110 in FIG. 1 will be further explained in combination with FIGS. 2A, 2B, and 3. FIG. 2A shows exemplary true friend permission database 214, according to one embodiment of the present invention, and corresponds to true friend permission database 114, in FIG. 1, while FIG. 2B shows exemplary community space permission database 216 corresponding to community space permission database 114, in FIG. 1. FIG. 3 shows a flowchart of an exemplary method of protecting a virtual community visitor from unauthorized social interaction. Certain details and features have been left out of flowchart 300 that are apparent to a person of ordinary skill in the art. For example, a step may comprise one or more substeps or may involve specialized equipment or materials, as known in the art. While steps 310 through 360 indicated in flowchart 300 are sufficient to describe one embodiment of the present invention, other embodiments of is the invention may utilize steps different from those shown in flowchart 300.

Continuing with flowchart 300 in FIG. 3, in conjunction with FIGS. 1, 2A, and 2B, step 310 of flowchart 300 comprises receiving a request seeking access to virtual community content from a virtual community visitor. Step 310 corresponds to receipt, at social interaction control software 10 in FIG. 1, of an input from user 124a or user 124b to access requested content contained on virtual community content server 102. Where virtual community content storage 106 contains mixed content including commercial entertainment and information without a social interaction component, as well as content providing an opportunity for social interaction, for example, a request to access virtual community content may correspond to simple consumption of provided content, or may manifest an intent to interact with another virtual community visitor.

The exemplary method of flowchart 300 continues with step 320, which comprises determining whether the requested virtual community content includes at least one social interaction opportunity. A social interaction opportunity may include engaging in a one-to-one communication with another virtual community visitor, for example, or entering a group conversation in a community space such as a chat room or community forum. In a virtual community offering mixed content, requested virtual community content may correspond to content unrelated to social interaction intermingled with content having a social interaction component. Where requested content contains even one opportunity for the requesting virtual community visitor to engage in social interaction, the requested virtual community content is treated as social interaction content for the purposes of the method embodied in flowchart 300.

If the requested virtual community content does not include a social interaction opportunity, social interaction control software 110 permits the virtual community visitor to access the content without further ado in step 330a. By distinguishing access requesting content without a social interaction component from that including a socialization component, the present method advantageously allows providers of mixed content to make their commercial content readily available to as large a group of visitors as can be attracted to the virtual community.

Where however, there is a determination that the requested virtual community content includes at least one social interaction opportunity, social interaction control software 110 functions to regulate any ensuing social interaction by prompting the virtual community visitor making the request to provide a visitor identity in step 330b of flowchart 300. Providing a visitor identity may correspond to performing a login, where the virtual community visitor is a registered virtual community user, for example. Where a virtual community visitor has not previously registered, providing a visitor identity may correspond to registering as a virtual community user.

Registration as a virtual community user may comprise providing the true identity of the virtual community visitor, as well as identifying contact information, such as an email or physical address, for example, and demographic information such as the present age and date of birth of the virtual community visitor. Registration may also include establishing a social interaction identity, such as a username, other than the true identity of the virtual community visitor, and a password facilitating login during subsequent is visits. In one embodiment, a social interaction identity may be associated with a visual asset, such as an avatar or icon, for example, providing the virtual community visitor with an opportunity to further personalize their social interaction opportunities.

Flowchart 300 continues with step 340, comprising associating the visitor identity with a socialization level. According to the exemplary embodiments of FIGS. 2A and 2B, the present method includes four possible socialization levels 212, corresponding to four different levels of freedom to engage in social interaction opportunities through virtual community content server 102. In the present embodiment, level 1 corresponds to a lowest socialization level, level 2 to a first intermediate socialization level, level 3 to a second intermediate socialization level, and level 4 to a highest socialization level, wherein a higher socialization level is associated with greater freedom to communicate than is a lower socialization level. Associating the visitor identity with a socialization level may be performed on the basis of the present age of the virtual community visitor, provided during registration as a virtual community user, for example.

In one embodiment, associating the visitor identity with a socialization level comprises associating the visitor identity with a lowest socialization level if the virtual community visitor is younger than a predetermined age, such as thirteen, for example. Analogously, associating the visitor identity with a socialization level may comprise associating the visitor identity with a highest socialization level if the virtual community visitor is at least eighteen years old. Where a virtual community visitor has a present age greater than or equal to a predetermined age, but less than 18, the visitor identity may be associated with either a first or second intermediate socialization level.

The degree of social interaction freedom associated with socialization levels 212 in FIG. 2 may correspond, for example, to the absence of restrictions limiting self identification to social interaction partners, the content of communications occurring between social interaction partners, and the authorization required to designate a social interaction partner as a trusted social interaction partner otherwise known as a true friend. In one embodiment, a lowest socialization level limits identification of the virtual community visitor associated with that socialization level according to a social interaction identity assumed by the virtual community visitor, but does not permit the virtual community visitor to reveal their true identity to a social interaction partner. In one embodiment, that lowest socialization level limits social interaction opportunities to exchanges of messages in a format known as speed chat comprising predetermined words and phrases, and/or prohibits virtual community visitors associated with that lowest socialization level from designating social interaction partners as true friends.

By comparison, a first intermediate socialization level may permit the additional freedom of designating a social interaction partner as a true friend when that designation is authorized by a socialization administrator, i.e., a legal adult, such as a parent of a virtual community visitor who is a minor child of the socialization administrator. In addition, a first intermediate socialization level may correspond to the freedom to engage in open chat comprising non-predetermined words and phrases, under certain conditions. A second intermediate socialization level might include the same general constraints, but permit self-authorization of a social interaction partner designated as a true friend, without independent authorization by a socialization administrator, for example. A highest socialization level, associated with the greatest degree of social interaction freedom, may enable a virtual community visitor associated with that level to receive open chat messages comprising non-predetermined words and phrases from any virtual community social interaction partner.

Moving on to step 350 of flowchart 300, step 350 comprises utilizing the socialization level associated with a visitor identity in one or more permission database to regulate access to social interaction opportunities. Regulation of access to social interaction opportunities is performed so as to protect a virtual community visitor from an unpleasant or harmful social interaction caused, albeit inadvertently, when the virtual community visitor seeks to access a social interaction opportunity in a community space or with a social interaction partner inappropriate to that virtual community visitor's age or social sophistication. FIGS. 2A and 2B provide examples implementing step 350. FIG. 2A shows exemplary true friend permission database 214 regulating one-to-one social interaction between social interaction partners mutually designated as true friends, defined previously, while FIG. 2B shows exemplary community space permission database 216 regulating social interaction between virtual community visitors in a community space such as a chat room or other community forum.

As can be seen from true friend permission database 212, in one described embodiment in which a visitor identity associated with a lowest socialization level precludes identification of another virtual community visitor as a true friend, all one-to-one interaction involving a social interaction partner having a lowest socialization level, i.e. level 1, is limited to speed chat. As previously explained, speed chat refers to messaging in which communications comprise pre-determined words and phrases, rather than open dialogue. For those visitor identities associated with the intermediate and highest socialization levels, however, i.e. level 2 through level 4, mutually designated trusted social interaction partners, or true friends, may communicate using open chat, in which the message content is not restricted to the pre-determined words and phrases constraining speed chat.

Turning to FIG. 2B, when social interaction occurs in a community space, so that social interaction can take place between social interaction partners not mutually designated as true friends, community space permission database 216 permits open chat only between social interaction partners sharing a highest socialization level. All other community space social interaction is limited to speed chat. FIGS. 2A and 2B also show that, according to the present embodiment, the regulation provided by the respective permission databases in each of those figures comprises restricting social interaction according to the lowest socialization level of any virtual community visitor participating in the social interaction. As can be seen from FIGS. 2A and 2B, socialization levels 212 together with true friend permission database 214 and community space permission database 216 determine what comprises authorized social interaction for a particular virtual community visitor under the pertinent circumstances. All other attempted social interaction may be considered unauthorized, and appropriately protected against.

Continuing with step 360 of flowchart 300, step 360 comprises assigning an updated socialization level to the virtual community visitor by one or more inputs received from a socialization administrator. As described in relation to step 340, initial association of a visitor identity with a socialization level may be performed on the basis of the present age of a virtual community visitor, provided during registration. Where association with a socialization level is performed on the basis of age as a preliminary matter, step 360 permits an adult identified as a socialization administrator to change, i.e. increase, or perhaps decrease the socialization level of a minor community website visitor. For example, a visitor identity initially associated with a lowest socialization level due to the virtual community visitor having a present age less than a predetermined age may be assigned an updated first or second intermediate socialization level, when such reassignment is sought by a parent or responsible adult identified as a socialization administrator for that virtual community visitor.

Figure 4A:
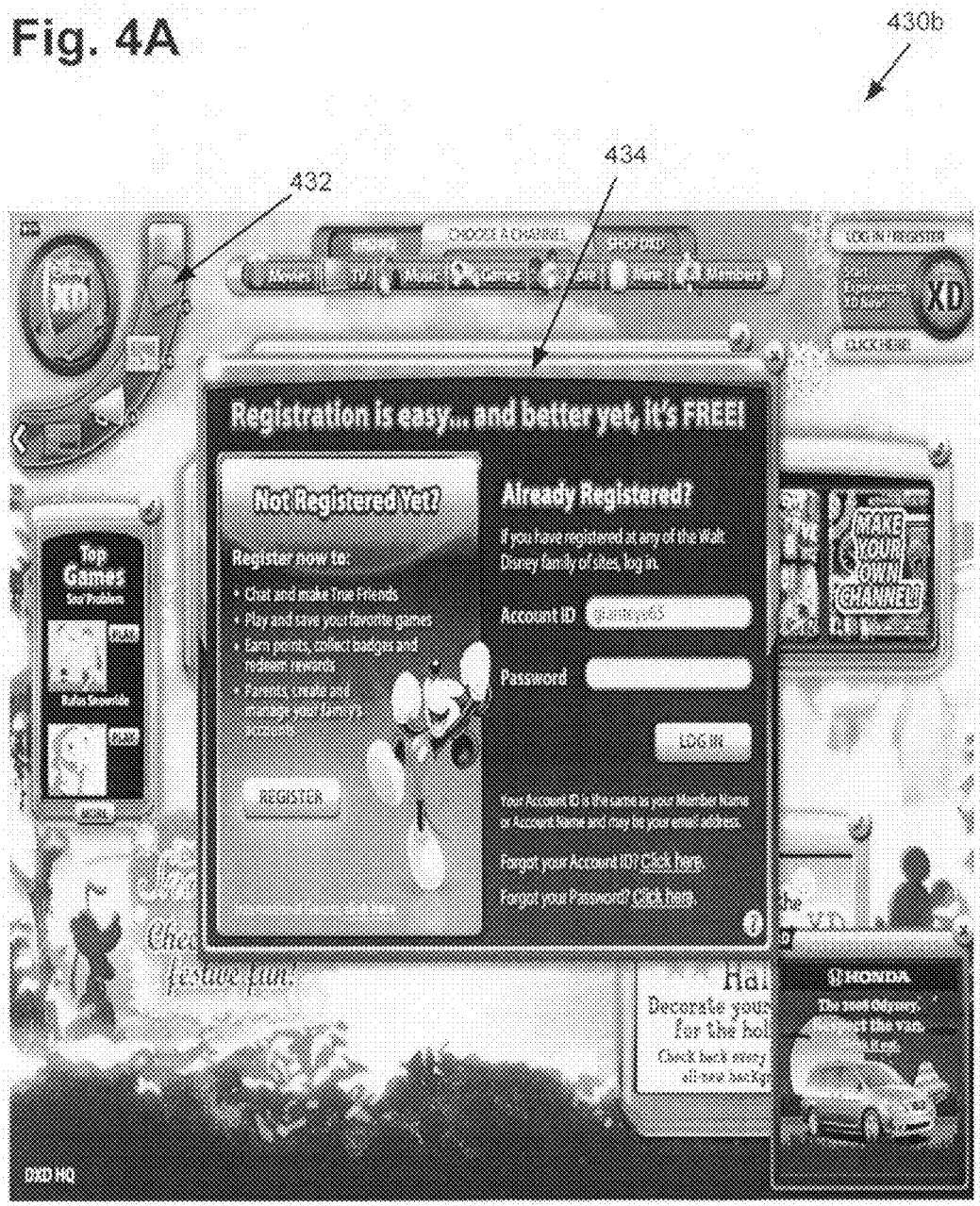
FIG. 4A shows a visual frame of an exemplary implementation of a method of protecting a virtual community visitor from unauthorized social interaction, according to one embodiment of the present invention.

Turning now to FIG. 4A, FIG. 4A shows visual frame 430b of an exemplary implementation of a method of protecting visitors to a virtual community from unauthorized social interaction, according to one embodiment of the present invention. Visual frame 430b may be seen to correspond to step 330b of flowchart 300, in FIG. 3. In FIG. 4A, an input from a Disney XD virtual community visitor requesting access to community chat through community chat icon 432 has resulted in display of a prompt requesting a visitor identity. In the present embodiment, the prompt appears as registration/login window 434. A virtual community visitor faced with the prompt shown in FIG. 4A may provide either login information previously associated with a socialization level in the Account ID and Password fields, or opt to complete a registration procedure. In either instance, the virtual community visitor seeking a social interaction opportunity through community chat is required to identify him or herself prior to being granted access to the social interaction content.

Figure 4B:
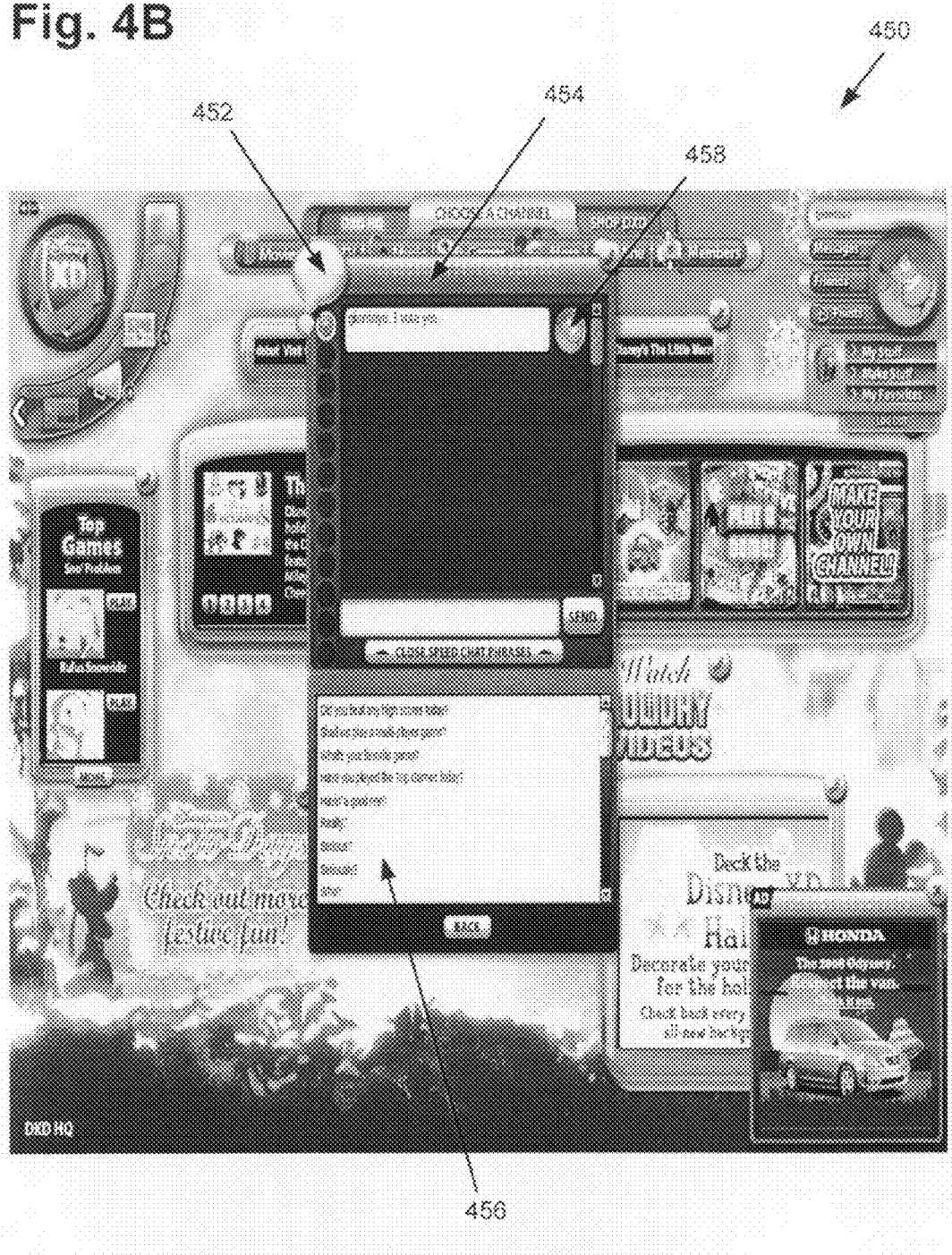
FIG. 4B shows another visual frame of an exemplary implementation of a method of protecting a virtual community visitor from unauthorized social interaction, according to one embodiment of the present invention.

As another example of rich multimedia interactive content produced according to an embodiment of the present invention, FIG. 4B shows visual frame 450 of an exemplary implementation of a method of protecting visitors to a virtual community from unauthorized social interaction, according to one embodiment of the present invention. Visual frame 450 may be seen to correspond to step 350 of flowchart 300, in FIG. 3, as well as to community space permission database 216, in FIG. 2B. Visual frame 450 in FIG. 4B is representative of social interaction occurring in a community chat room, as shown by community chat icon 452 marking messaging window 454. As may be seen in FIG. 4B, a virtual community visitor having social interaction identity "gianteye" has posted a communication. The virtual community visitor receiving visual frame 450 as a display has the option of engaging "gianteye" as a social interaction partner using predetermined words and phrases provided on speed chat phrase list 456. It is noted that in the present embodiment, social interaction is regulated to reveal the social interaction identity and display asset 458 assumed by the virtual community visitor known as "gianteye," but not the true likeness nor true identity of "gianteye."

Figure 5:
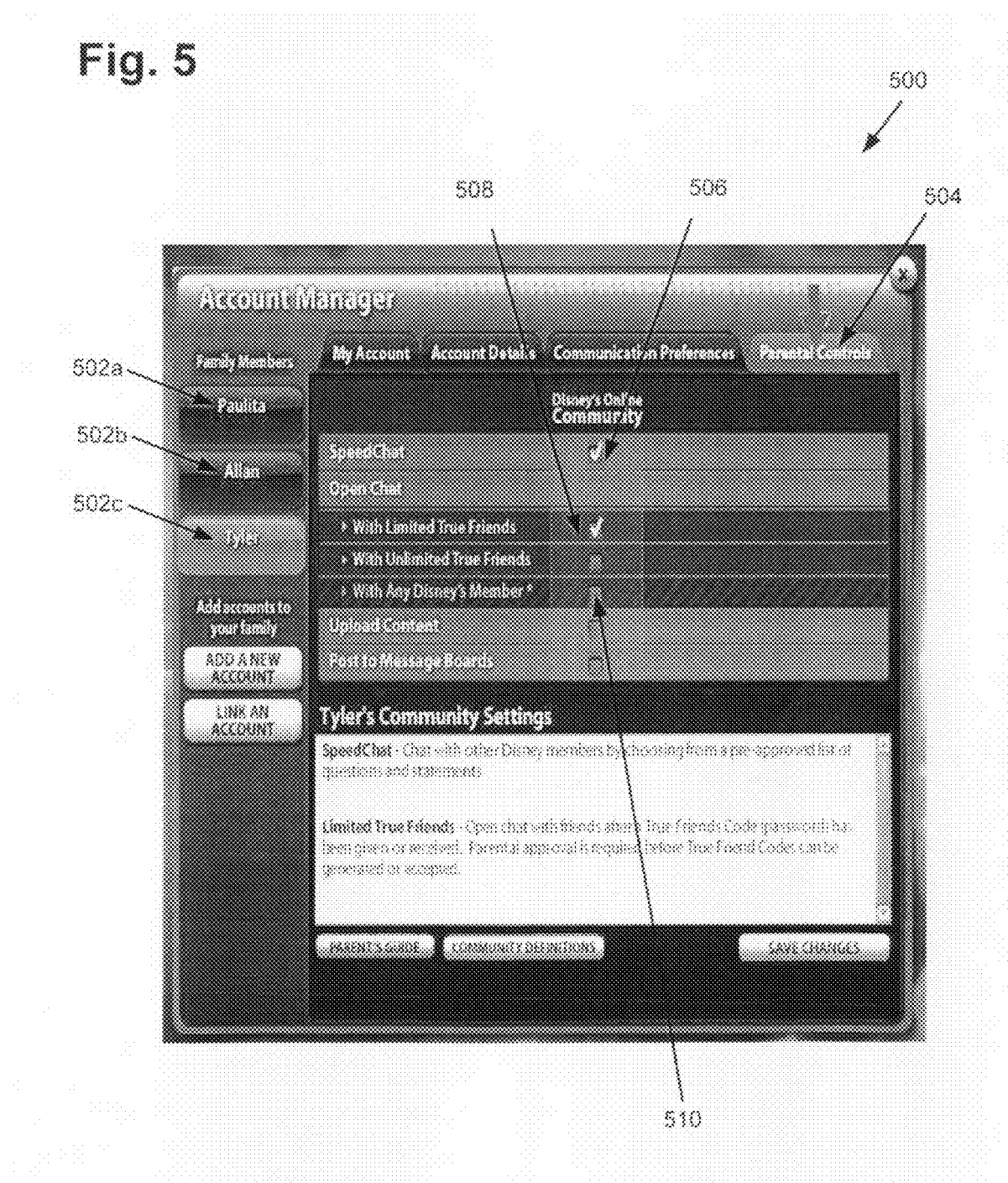
FIG. 5 shows a visual frame of a social administrator control screen in an exemplary implementation of a method of protecting a virtual community visitor from unauthorized social interaction, according to one embodiment of the present invention.

FIG. 5 shows visual frame 560 of an exemplary social administrator control screen, according to one embodiment of the present invention. Visual frame 560 corresponds to the situation in which a social administrator is a parent, exercising control over the socialization levels associated with minor children seeking to access virtual community content. As shown in FIG. 5, the parent, or account manager for the accounts assigned to family members Paulita, Allan, and Tyler, may view and update the socialization levels associated with each family member. For example, selection of parental control tab 504 when account 502a assigned to Tyler is highlighted, reveals the socialization level associated with Tyler's visitor identity. In this case, Tyler is authorized by his parent social administrator to engage in speed chat, and in open chat with limited true friends, as shown by input checkmarks to selection boxes 506 and 508, respectively. In one embodiment, the present socialization level associated with Tyler's visitor identity may correspond to a first intermediate socialization level, as described previously.

As may be seen from FIG. 5, visual frame 560 may correspond to step 360 of flowchart 300, in FIG. 3. According to the present embodiment, the parent account manager may update the socialization level associated with Tyler's visitor identity by providing inputs so as to select or deselect the available socialization options. For instance, the account manager can limit Tyler to speed chat messaging only by deselecting selection box 508 corresponding to open chat with limited true friends. Alternatively, the account manager can authorize open chat with any other registered virtual community visitor, without regard to true friend status, by entering a check in selection box 510.

Thus, the present application discloses a method of protecting a visitor to a virtual community from unauthorized social interaction. By prompting a virtual community visitor seeking to participate in community mediated social interaction to provide a visitor identity, and associating the visitor identity with a socialization level, one embodiment of the present invention determines parameters within which social interaction involving that virtual community visitor is authorized. By utilizing the socialization levels associated with virtual community visitors in a permission database, one embodiment of the present invention regulates social interaction amongst virtual community visitors. Moreover, by distinguishing virtual community visitors seeking to engage in social interaction from those seeking only to access commercial content lacking a social interaction component, one embodiment of the present invention provides protection from unauthorized social interaction while advantageously making commercial content freely accessible to all virtual community visitors.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for execution by a processor for protecting a virtual community visitor to a virtual community from an unauthorized social interaction, the method comprising:
   receiving, using the processor, a request from the virtual community visitor seeking access to a virtual community content;
   determining, using the processor, whether the virtual community content includes at least one social interaction opportunity;
   allowing access, using the processor, to the requested virtual community content without first identifying the virtual community visitor if the determining determines that the virtual community content does not include the at least one social interaction opportunity;
   prompting the virtual community visitor, using the processor, to provide a visitor identity if the virtual community content includes the at least one social interaction opportunity;
   associating, using the processor, the visitor identity with a socialization level; and
   utilizing, using the processor, the socialization level in one or more permission database to regulate access to the at least one social interaction opportunity to protect the virtual community visitor from the unauthorized social interaction by accessing the at least one social interaction opportunity.

2. The method of claim 1, wherein a regulation provided by the one or more permission database comprises restricting the at least one social interaction opportunity according to a lowest socialization level of any virtual community visitor participating in the at least one social interaction opportunity.

3. The method of claim 1, wherein a lowest socialization level limits the at least one interaction opportunity to exchange of messages comprising predetermined words and phrases.

4. The method of claim 1, wherein a lowest socialization level limits identification of the virtual community visitor according to a social interaction identity assumed by the virtual community visitor, other than a true identity of the virtual community visitor.

5. The method of claim 1, wherein the step of associating the visitor identity with a socialization level comprises associating the visitor identity with a lowest socialization level if the virtual community visitor is younger than a predetermined age.

6. The method of claim 1, wherein messages exchanged between more than one virtual community visitor mutually designated as true friends comprises non-predetermined words and phrases.

7. The method of claim 1, further comprising assigning an updated socialization level to the virtual community visitor by one or more inputs received from a socialization administrator.

8. The method of claim 7, wherein a first intermediate socialization level requires authorization of the socialization administrator for designation of a virtual community social interaction partner as a true friend.

9. The method of claim 1, wherein a second intermediate socialization level permits self-authorization for designation of a virtual community social interaction partner as a true friend.

10. The method of claim 1, wherein the step of associating the visitor identity with a socialization level comprises associating the visitor identity with a second intermediate socialization level if the virtual community visitor has an age greater than or equal to a predetermined age, but less than eighteen.

11. The method of claim 1, wherein the step of associating the visitor identity with a socialization level comprises associating the visitor identity with a highest socialization level if the virtual community visitor is at least eighteen years old.

12. The method of claim 1, wherein a virtual community visitor associated with a highest socialization level may receive messages comprising non-predetermined words and phrases from any virtual community social interaction partner.

13. A system for protecting virtual community visitor to a virtual community from an unauthorized social interaction, the system comprising: a virtual community content server; a microprocessor in the virtual community content server, the microprocessor configured to execute instructions included in a social interaction control software; and the social interaction control software comprising instructions which, when executed by the microprocessor, cause the microprocessor to: receive a request from the virtual community visitor seeking access to a virtual community content; determine whether the virtual community content includes at least one social interaction opportunity; allow access to the requested virtual community content without first identifying the virtual community visitor if the microprocessor determines that the virtual community content does not include the at least one social interaction opportunity; prompt the virtual community visitor to provide a visitor identify if the virtual community content includes the at least one social interaction opportunity; associate the visitor identity with a socialization level; and utilize the socialization level in the one or more permission database to regulate access to the at least one social interaction opportunity to protect the virtual community visitor from the unauthorized social interaction by accessing the at least one social interaction opportunity.

14. The system of claim 13, wherein a regulation provided by the one or more permission database comprises restricting the at least one social interaction opportunity according to a lowest socialization level of any virtual community visitor participating in the at least on social interaction opportunity.

15. The system of claim 13, wherein associating the visitor identity with a socialization level comprises associating the visitor identity with a lowest socialization level if the virtual community visitor is younger than a predetermined age.

16. The system of claim 13, wherein the social interaction control software further comprises instructions which, when executed by the microprocessor, cause the microprocessor to assign an updated socialization level to the virtual community visitor by one or more inputs received from a socialization administrator.

17. The system of claim 16, wherein a first intermediate socialization level requires authorization of the socialization administrator for designation of a virtual community social interaction partner as a true friend.

18. The system of claim 13, wherein a second intermediate socialization level permits self-authorization for designation of a virtual community social interaction partner as a true friend.

* * * * *